US011561625B2

(12) United States Patent
Otani

(10) Patent No.: US 11,561,625 B2
(45) Date of Patent: Jan. 24, 2023

(54) LIGHT OUTPUTTING APPARATUS AND IMAGE DISPLAY SYSTEM

(71) Applicant: SEIKO EPSON CORPORATION, Tokyo (JP)

(72) Inventor: Makoto Otani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 250 days.

(21) Appl. No.: 16/953,417

(22) Filed: Nov. 20, 2020

(65) Prior Publication Data
US 2021/0157416 A1 May 27, 2021

(30) Foreign Application Priority Data
Nov. 21, 2019 (JP) .............................. JP2019-210252

(51) Int. Cl.
| G02B 27/10 | (2006.01) |
| G06F 3/03 | (2006.01) |
| G02B 27/09 | (2006.01) |
| G02B 19/00 | (2006.01) |
| F21V 5/04 | (2006.01) |
| G01S 17/04 | (2020.01) |

(52) U.S. Cl.
CPC ............ *G06F 3/0304* (2013.01); *F21V 5/045* (2013.01); *G01S 17/04* (2020.01); *G02B 19/0052* (2013.01); *G02B 27/0905* (2013.01); *G02B 27/095* (2013.01); *G02B 27/0927* (2013.01)

(58) Field of Classification Search
CPC ............ G02B 27/0905; G02B 27/0927; G02B 27/095; G02B 27/0972; G02B 27/0977; G06F 3/0304; G01S 17/04

USPC .......................................................... 362/268
See application file for complete search history.

(56) References Cited

U.S. PATENT DOCUMENTS

| 10,416,424 | B2 * | 9/2019 | Otani ................. G03B 21/2013 |
| 10,502,938 | B2 * | 12/2019 | Otani .................... G02B 19/009 |
| 10,802,607 | B2 * | 10/2020 | Otani ....................... F21V 5/004 |
| 10,830,412 | B2 * | 11/2020 | Otani ..................... H04N 9/3194 |
| 10,942,358 | B2 * | 3/2021 | Otani ................. G02B 27/0961 |
| 11,022,812 | B2 * | 6/2021 | Otani ................... G03B 21/142 |
| 11,231,643 | B2 * | 1/2022 | Otani ................. G02B 27/0927 |
| 2015/0116216 | A1 | 4/2015 | Sakai et al. |
| 2016/0097843 | A1 * | 4/2016 | Nakamura ......... G02B 27/0927 250/221 |
| 2018/0284409 | A1 * | 10/2018 | Otani ................. G02B 27/0927 |

(Continued)

FOREIGN PATENT DOCUMENTS

JP 2015-111385 A 6/2015

*Primary Examiner* — Christopher M Raabe
(74) *Attorney, Agent, or Firm* — Dority & Manning, P.A.

(57) ABSTRACT

A light outputting apparatus includes a light source that outputs a first light flux, a collimator that parallelizes the first light flux, a light separator that separates the first light flux into a first partial light flux and a second partial light flux, a first light flux width expander, and a second light flux width expander. The light separator causes the first partial light flux to exit in a first direction and the second partial light flux to exit in a second direction. When a first plane is assumed to be a plane containing the first direction and the second direction, the first light flux width expander expands a width of the first partial light flux in a direction along the first plane, and the second light flux width expander expands a width of the second partial light flux in a direction along the first plane.

9 Claims, 7 Drawing Sheets

(56) References Cited

U.S. PATENT DOCUMENTS

| | | | |
|---|---|---|---|
| 2018/0284410 A1* | 10/2018 | Otani | G06F 3/0425 |
| 2019/0179158 A1* | 6/2019 | Otani | G02B 27/0961 |
| 2019/0220103 A1* | 7/2019 | Otani | G02B 27/0961 |
| 2020/0049819 A1* | 2/2020 | Cho | G02B 26/123 |
| 2020/0063943 A1* | 2/2020 | Otani | H04N 9/3102 |
| 2020/0064646 A1* | 2/2020 | Otani | G03B 17/54 |
| 2020/0064723 A1* | 2/2020 | Otani | G02B 19/0014 |
| 2020/0341143 A1* | 10/2020 | Weinberg | G01S 7/4816 |

* cited by examiner

LIGHT OUTPUTTING APPARATUS AND IMAGE DISPLAY SYSTEM

The present application is based on, and claims priority from JP Application Serial Number 2019-210252, filed Nov. 21, 2019, the disclosure of which is hereby incorporated by reference herein in its entirety.

BACKGROUND

1. Technical Field

The present disclosure relates to a light outputting apparatus and an image display system including the light outputting apparatus.

2. Related Art

JP-A-2015-111385 discloses an image display system that detects the position of a pointing element, such as a pen and a finger, which is operated on a display surface, such as a screen, on which an image is displayed and performs display and operation according to the trajectory of the pointing element. The image display system disclosed in JP-A-2015-111365 includes a projector and a light outputting apparatus that outputs light along a projection surface (display surface) on which the projector performs projection, and the image display system uses the light outputted from the light outputting apparatus to form a light curtain that covers the projection surface. The projector detects the position of the pointing element based on the light reflected off the pointing element operated on the projection surface and performs projection based on the result of the detection.

The light outputting apparatus described in JP-A-2015-111385 includes a first light outputting section and a second light outputting section. The first light outputting section and the second light outputting section each include a light source, a collimation lens, and a Powell lens. The first light outputting section and the second light outputting section are so disposed that the center axes of the light outputted from the light outputting sections incline in opposite directions with respect to a reference plane perpendicular to the projection surface.

FIG. 7 is a diagrammatic view showing a schematic configuration of a light outputting apparatus 102 according to Comparative Example. The light outputting apparatus 102 includes an apparatus main body 101 and a cover lens 109, as shown in FIG. 7. The light outputting apparatus 102 further includes a first light outputting section 103 and a second light outputting section 104. The first light outputting section 103 and the second light outputting section 104 each include a light source 105, a collimation lens 106, and Powell lenses 108. The Powell lenses 108 are arranged on the surface of an optical element 107 to form an array. An optical axis 103A of a first light flux E1 outputted from the first light outputting section 103 inclines in the clockwise direction with respect to an imaginary central plane Pv perpendicular to the projection surface, and an optical axis 104A of a second light flux E2 outputted from the second light outputting section 104 inclines in the counterclockwise direction with respect to an imaginary central plane Pv.

Providing two light outputting sections as in JP-A-2015-111385 and Comparative Example allows one of the light outputting sections to output light toward the left end of the lower end of the projection surface and the other light outputting section to output light toward the right end of the lower end of the projection surface. A light curtain that covers the entire projection surface can therefore be formed, whereby the differences in optical intensity among the positions on the projection surface can be reduced. Using two light outputting sections, however, causes a problem of an increase in the number of parts and in turn an increase in cost.

SUMMARY

In view of the problem described above, an object of the present disclosure is reduction in the number of parts of a light outputting apparatus and reduction in cost thereof.

A light outputting apparatus according to an aspect of the present disclosure includes a light source that outputs a first light flux, a collimator that parallelizes the first light flux, a light separator that separates the first light flux into a first partial light flux and a second partial light flux, a first light flux width expander, and a second light flux width expander. The light separator causes the first partial light flux to exit in a first direction and the second partial light flux to exit in a second direction. When a first plane is assumed to be a plane containing the first direction and the second direction, the first light flux width expander expands a width of the first partial light flux in a direction along the first plane, and the second light flux width expander expands a width of the second partial light flux in a direction along the first plane.

An image display system according to another aspect of the present disclosure includes the light outputting apparatus described above, a detection apparatus that detects a position where light outputted from the light outputting apparatus is reflected, and a projection apparatus that projects an image according to a result of the detection performed by the detection apparatus.

DESCRIPTION OF EXEMPLARY EMBODIMENTS

Figure 1:
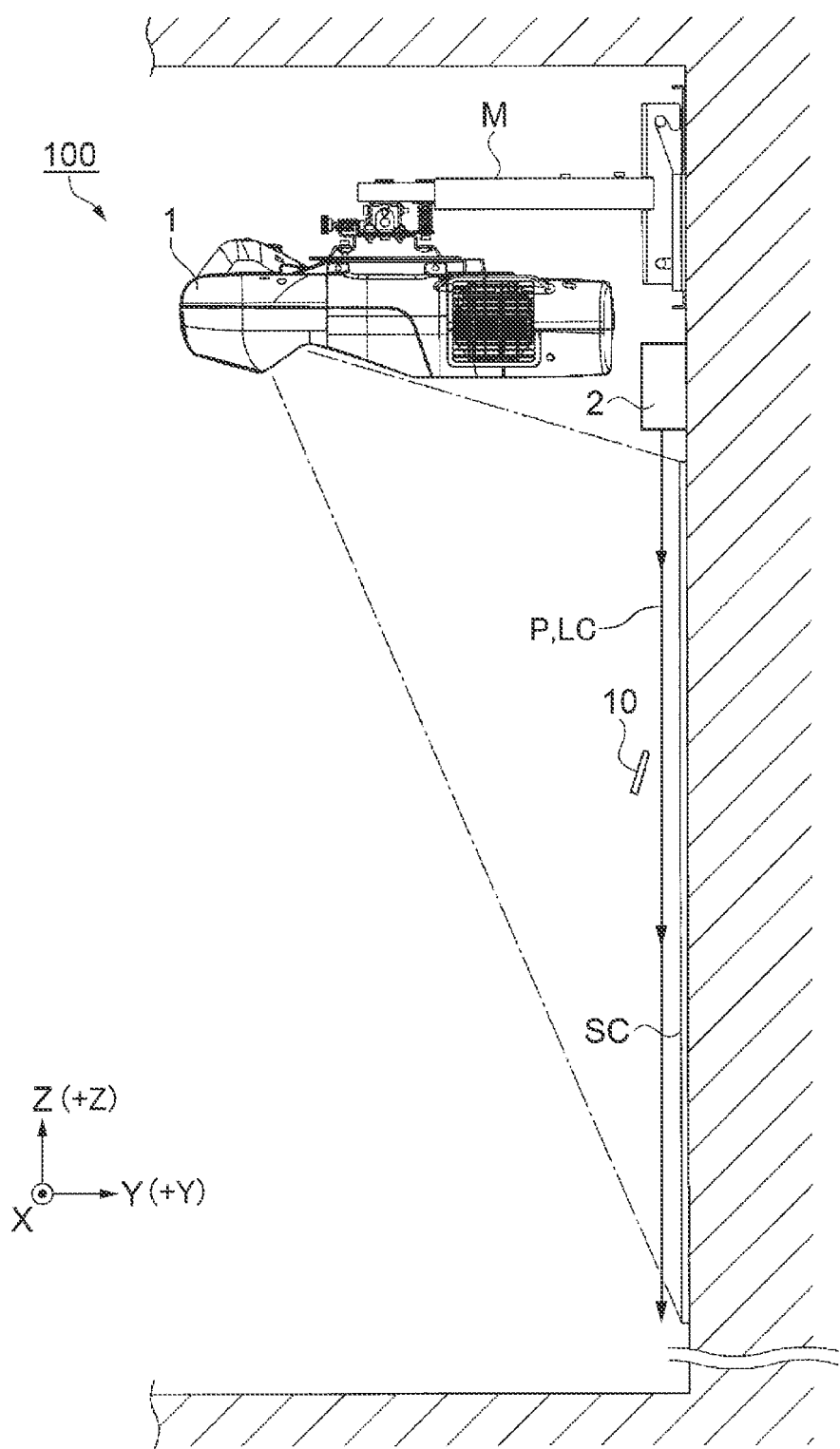
FIG. 1 is a diagrammatic view showing a schematic configuration of an image display system according to a first embodiment.

Embodiments of the present disclosure will be described below with reference to the drawings. Each component in the following drawings is so drawn at a dimension and a scale different as appropriate from an actual dimension and scale as to be large enough to be recognizable in the drawings.

First Embodiment

Configuration of Image Display System

FIG. 1 is a diagrammatic view showing a schematic configuration of an image display system 100 according to a first embodiment. The image display system 100 includes a projector 1 and a light outputting apparatus 2. The projector 1 is supported by a support apparatus M, which is installed on a wall surface above a projection surface SC, such as a screen and a whiteboard, and projects an image through a surface of the projector 1 that is the surface facing downward on the projection surface SC. The light outputting apparatus 2 is installed in a position above the projection surface SC. The light outputting apparatus 2 outputs light along the projection surface SC to create a light curtain LC.

In the present specification, the directions are defined as shown in FIG. 1 for ease of description. The direction of a normal to the projection surface SC is a forward/rearward direction Y, and the direction toward the projection surface SC is the forward direction (direction +Y). The vertical direction (gravity direction) is a direction Z, and the direction against the gravity is an upward direction (direction +Z). The direction perpendicular to the forward/rearward direction Y and the vertical direction Z is a rightward/leftward direction X, and the direction toward the right side viewed in the direction toward the projection surface SC is a direction +X. The projection surface SC is a surface parallel to the plane XZ.

Figure 2:
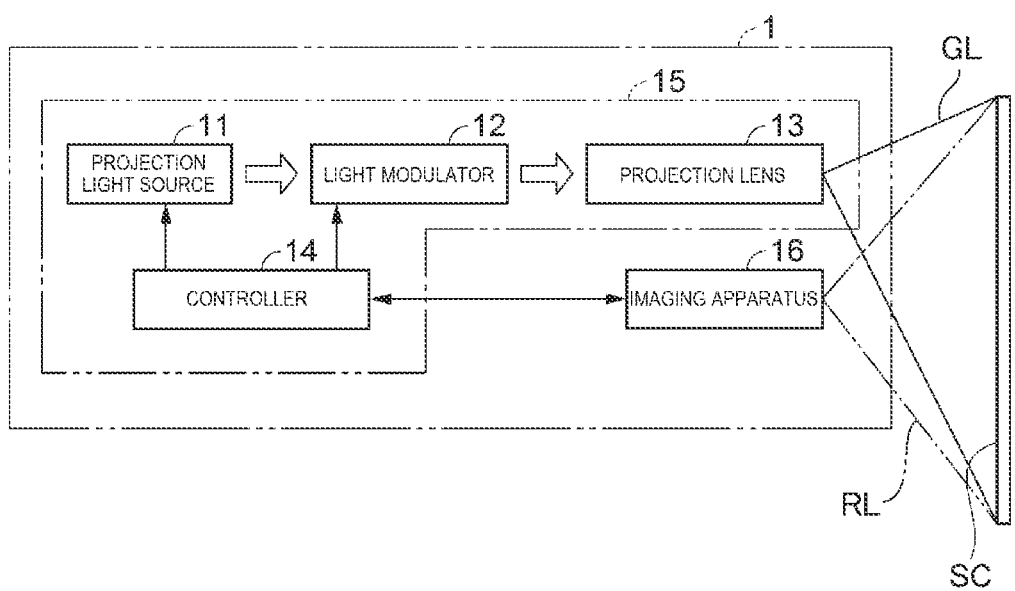
FIG. 2 is a block diagram showing a schematic configuration of a projector.

FIG. 2 is a block diagram showing a schematic configuration of the projector 1. The projector 1 includes a projection apparatus 15 and an imaging apparatus 16 as a detection apparatus. The projection apparatus 15 includes a projection light source 11, a light modulator 12, a projection lens 13, and a controller 14. The projection apparatus 15 projects an image according to inputted image information and an image according to the result of detection performed by the imaging apparatus 16 in the form of video light GL via the projection lens 13.

In the projection apparatus 15, the light modulator 12 modulates light outputted from the projection light source 11 in accordance with image information, and the projection lens 13 projects the modulated light on the projection surface SC. The projection light source 11 can be a discharge-type light source or a solid-state light source, such as a light emitting diode and a laser. The light modulator 12 can, for example, be an apparatus using a liquid crystal panel or a micromirror-type apparatus, for example, an apparatus using a DMD.

The controller 14 includes a CPU, a ROM, a RAM, and other components and functions as a computer. The controller 14 controls the action of the projector 1, and also performs, for example, control relating to image projection based on information outputted from the imaging apparatus 16, which will be described later.

The imaging apparatus 16 includes an imaging device (not shown), such as a CCD and a CMOS device, captures an image of the projection surface SC as a subject, and outputs information on the captured image to the controller 14. When the light outputted from the light outputting apparatus 2 is reflected off a pointing element (pen 10 or user's finger, for example), the imaging apparatus 16 senses reflected light RL, which is a component of the reflected light, to detect the position of the pointing element (reflection position) and outputs information on the detected position to the controller 14.

The projector 1 analyzes the position of the pointing element on the projection surface SC based on the information outputted from the imaging apparatus 16. Based on the result of the analysis, the projector 1, for example, projects a superimposed image formed of the image information on which a line representing the trajectory of the pointing element is superimposed, changes the projected image, and performs other types of operation. The thus configured projector 1 can perform interactive image display operation that is image display operation according to the user's action on the projection surface SC.

Configuration of Light Outputting Apparatus

Figure 3:
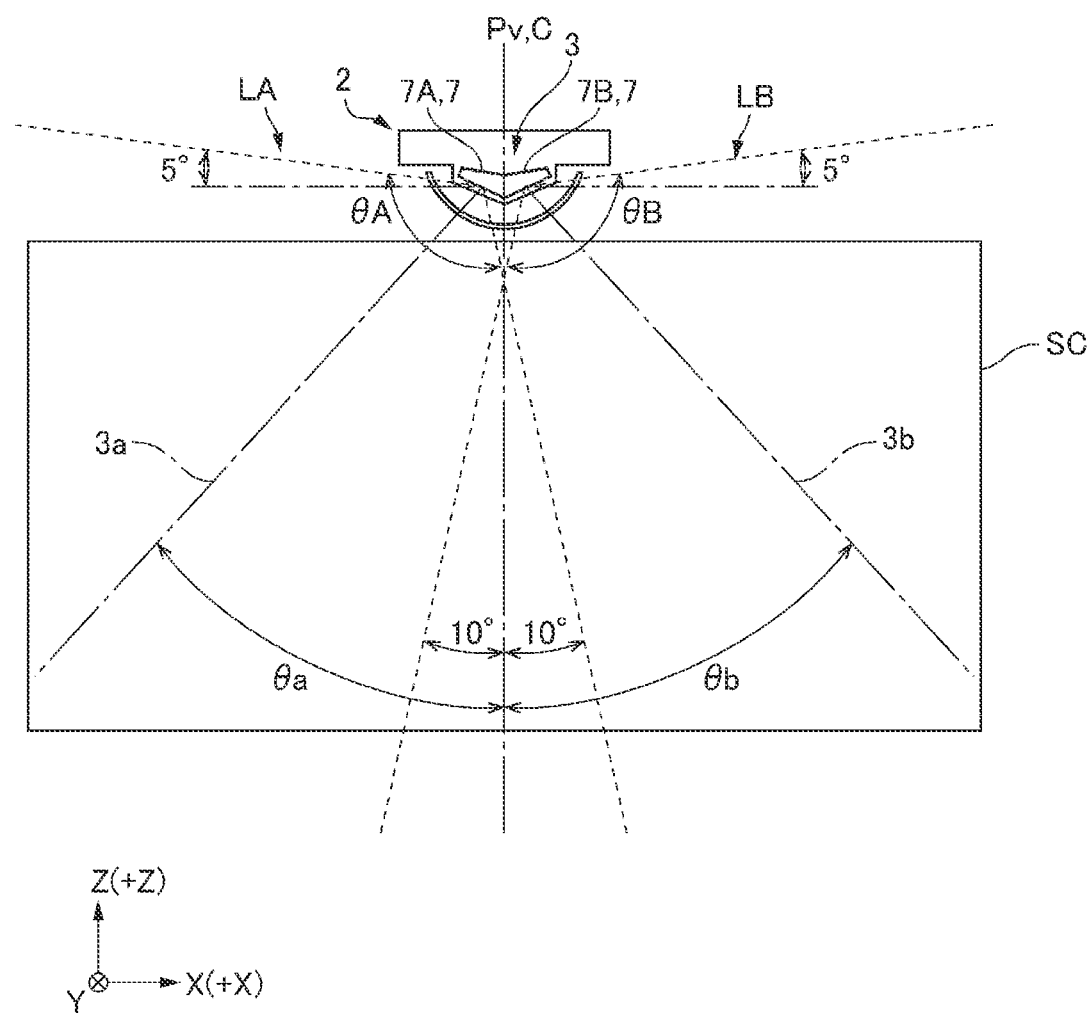
FIG. 3 is a diagrammatic view of a projection surface and a light outputting apparatus viewed from a position in front of the projection surface.
Figure 4:
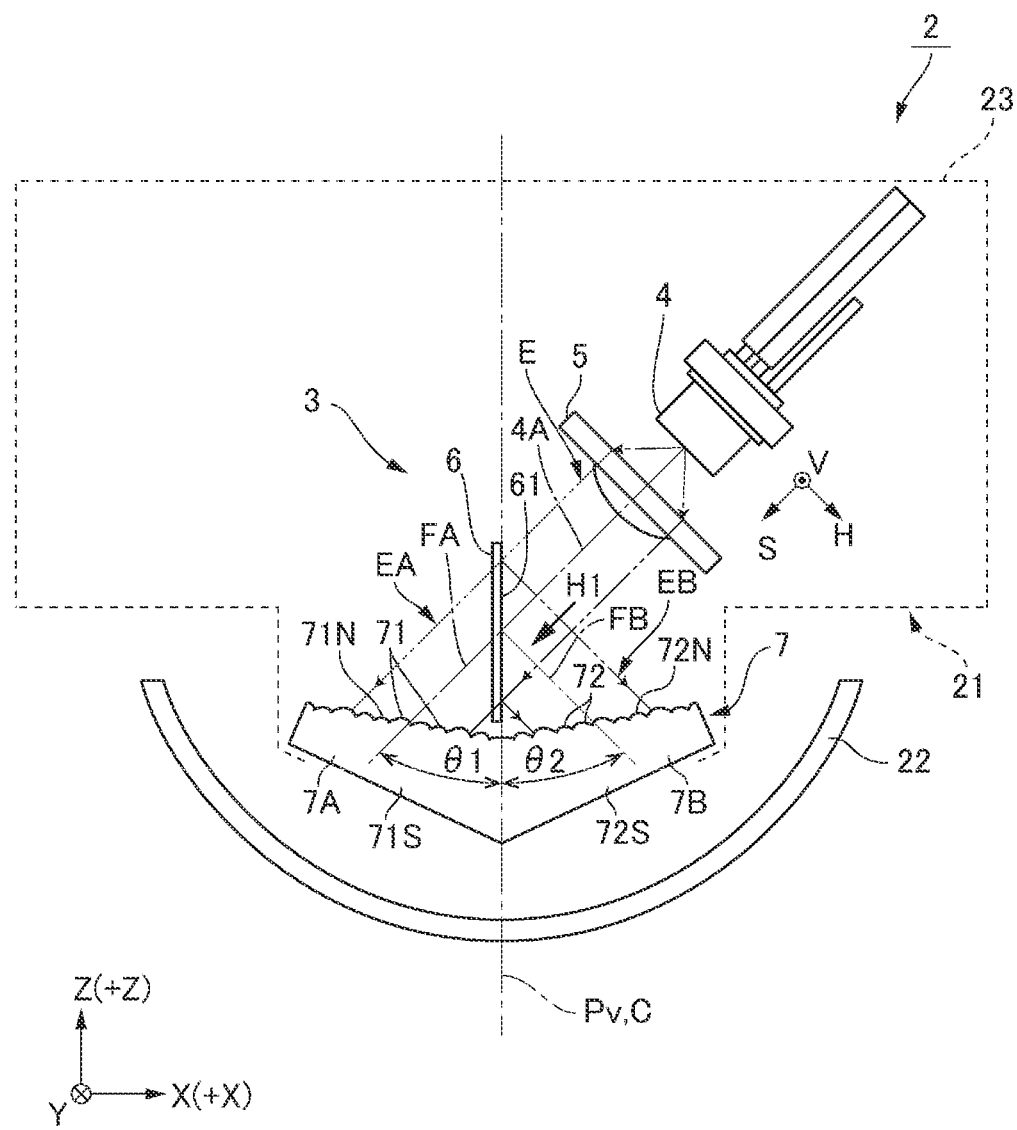
FIG. 4 is a diagrammatic view showing a schematic configuration of the light outputting apparatus according to the first embodiment.

FIG. 3 is a diagrammatic view of the projection surface SC and the light outputting apparatus 2 viewed from a position in front of the projection surface SC. FIG. 4 is a diagrammatic view showing a schematic configuration of the light outputting apparatus 2. The light outputting apparatus 2 is disposed in a position above the projection surface SC (on positive side of direction Z) and substantially at the center of the projection surface SC in the rightward/leftward direction X, as shown in FIG. 3. The light outputting apparatus 2 outputs light along the projection surface SC. The light outputting apparatus 2 includes an apparatus main body 21 and a cover lens 22. The apparatus main body 21 includes an enclosure 23 and a light outputting section 3 accommodated in the enclosure 23. FIG. 3 shows only part of the light outputting section 3 (light flux width expander 7) and does not show the other portions of the light outputting section 3.

The light outputting section 3 includes a light source 4, a collimator 5, a light separator 6, and a light flux width expander 7, as shown in FIG. 4. The light flux width expander 7 includes a first light flux width expander 7A and a second light flux width expander 7B. The first light flux width expander 7A and the second light flux width expander 7B are configured symmetrically with respect to an imaginary central surface C, which is located between the first light flux width expander 7A and the second light flux width expander 7B, as be described later. The light outputting section 3 outputs light from the first light flux width expander 7A and the second light flux width expander 7B in directions different from each other. The light outputting section 3 outputs first output light LA from the first light flux width expander 7A and second output light LB from the second light flux width expander 7B, as shown in FIG. 3.

It is assumed that an imaginary central plane Pv is the plane perpendicular to the projection surface SC at the center of the projection surface SC in the rightward/leftward direction X and extending in the vertical direction Z (plane along plane YZ), and the imaginary central plane C of the light flux width expander 7 coincides with the imaginary central plane Pv, as shown in FIG. 3. The first output light LA and the second output light LB are outputted substantially symmetrically with respect to the imaginary central plane Pv. The first output light LA forms a light curtain LC on the left of the imaginary central plane Pv (side opposite to positive side of direction X), and the second output light LB forms a light curtain LC on the right of the imaginary central plane Pv (positive side of direction X). Part of the first output light LA and part of the second output light LB overlap with each other at the center of the projection surface SC in the rightward/leftward direction X. The light outputting apparatus 2 thus outputs light to the area along the entire projection surface SC to create the light curtain LC, which covers the entire projection surface SC.

The first output light LA is maximized in terms of optical intensity in the positions on a first optical axis 3a and spreads in the directions along the projection surface SC on opposite sides of the first optical axis 3a. It is assumed that the optical intensity on the first optical axis 3a is called a peak intensity, and that the angular range over which the optical intensity is higher than or equal to a predetermined proportion of the peak intensity is an effective range θA, and the effective range θA of the first output light LA is set at a predetermined angular range greater than 90° around the first optical axis 3a. For example, it is assumed that the effective range θA is the range over which the intensity is higher than or equal to 10% of the peak intensity, and the effective range θA is set as the range between the direction inclining by 10° with respect to the imaginary central plane Pv in the direction away from the first optical axis 3a (positive side of direction X) and the direction inclining by 5° upward (toward positive side of direction Z) from the horizontal direction.

The second output light LB has a peak intensity in the positions on a second optical axis 3b, which is so set that the first optical axis 3a and the second optical axis 3b are symmetric with respect to the imaginary central plane Pv, and spreads in the directions along the projection surface SC on opposite sides of the second optical axis 3b. An effective range θB of the second output light LB is the same as the effective range θA of the first output light LA (θA=θB). That is, the effective range θB of the second output light LB is set as the range between the direction inclining by 10° with respect to the imaginary central plane Pv in the direction away from the second optical axis 3b (side opposite to positive side of direction X) and the direction inclining by 5° upward (toward positive side of direction Z) from the horizontal direction.

The first output light LA and the second output light LB are so outputted that the first optical axis 3a inclines in the counterclockwise direction with respect to the imaginary central plane Pv and the second optical axis 3b inclines in the clockwise direction with respect to the imaginary central plane Pv. An inclination angle θa of the first optical axis 3a with respect to the imaginary central plane Pv is equal to an inclination angle θb of the second optical axis 3b with respect to the imaginary central plane Pv (θa=θb).

The inclination angles θa and θb are set at an angle corresponding to the aspect ratio of the projection surface SC. For example, the light outputting apparatus 2 is configured to efficiently output the light along the projection surface SC, which is laterally elongated and has an aspect ratio of 16:10. Specifically, to maximize the intensity of the light traveling toward the right and left ends of the lower edge of the projection surface SC, which are the positions farthest from the light outputting apparatus 2, the inclination angles θa and θb are so set that the first optical axis 3a extends toward the left end of the lower edge of the projection surface SC and the second optical axis 3b extends toward the right end of the lower edge of the projection surface SC. The aspect ratio of the projection surface SC is not limited to 16:10 and may be another value. For example, the aspect ratio may be 2:1 or 4:3.

In the light outputting apparatus 2, the light source 4 is a laser light source that outputs light having an optical intensity that peaks at a wavelength of about 940 nm and includes, for example, an active layer that is a light emitter and cladding layers layered on opposite sides of the active layer. The light source 4 is of a type in which the light orientation characteristic in a width direction H, which extends along the active layer, differs from the light orientation characteristic in a layering direction V, which is perpendicular to the width direction H and in which the active layer and the cladding layers are layered on each other, for example, a multimode-oscillation-type laser light source. The light from the light source 4 is outputted in a direction S, which is perpendicular to the width direction H and the layering direction V, as shown in FIG. 4. That is, the direction S is the direction along an optical axis 4A of the light source 4. In the first embodiment, the width direction H and the direction S are directions along the projection surface SC. That is, the light outputting apparatus 2 is so installed that the width direction H and the direction S are parallel to the plane XZ.

The collimator 5 substantially parallelizes a first light flux E outputted from the light source 4. That is, the collimator 5 causes the first light flux E, which is outputted from one point on the optical axis 4A and spreads at an angle with respect to the optical axis 4A, to travel in substantially parallel to the optical axis 4A.

The light separator 6 separates the first light flux E into a first partial light flux EA and a second partial light flux EB and outputs the partial light fluxes in different directions. The light separator 6 in the first embodiment is a half-silvered mirror. The first partial light flux EA is a light flux having passed through the light separator 6 and exits out of the light separator 6 in a first direction FA. The second partial light flux EB is a light flux reflected off a reflection surface 61 of the light separator 6 and exits out of the light separator 6 in a second direction FB. The first partial light flux EA and the second partial light flux EB maintain the parallelized state achieved by the collimator 5.

The light separator 6 has the reflection surface 61, which is located in the same plane as the imaginary central plane C of the light flux width expander 7. The first partial light flux EA and the second partial light flux EB therefore exit in a bilaterally symmetric manner with respect to the imaginary central plane C. When viewed from the negative side of the direction Y, the first direction FA inclines in the counterclockwise direction with respect to the imaginary central plane C. The second direction FB inclines in the clockwise direction with respect to the imaginary central plane C. An inclination angle θ1 of the first direction FA with respect to the imaginary central plane C is equal to an inclination angle θ2 of the second direction FB with respect to the imaginary central plane C (θ1=θ2).

The light outputting apparatus 2 is so installed that the direction S, which is the direction in which the first light flux E to be incident on the light separator 6 is outputted, is a direction along the projection surface SC, as described above. A first plane P (see FIG. 1), which contains the first direction FA, which is the direction in which the first partial light flux EA separated by the light separator 6 exits, and the second direction FB, which is the direction in which the second partial light flux EB separated by the light separator 6 exits, is a plane parallel to the projection surface SC and also parallel to the plane XZ. The light flux width expander 7 expands the widths of the first partial light flux EA and the second partial light flux EB in directions along the first plane P.

The light flux width expander 7 is a single optical element. That is, the first light flux width expander 7A and the second light flux width expander 7B are provided in the form of a single optical element. The light flux width expander 7 is made, for example, of a synthetic resin material having a high refractive index and has a rectangular shape when viewed from the vertical direction Z. The light flux width expander 7 includes the first light flux width expander 7A on the left (negative side of direction X) and the second light flux width expander 7B on the right (positive side of direction X), as shown in FIG. 4. The light flux width expander 7 has a shape bilaterally symmetric with respect to the imaginary central plane C. The first light flux width expander 7A and the second light flux width expander 7B are therefore configured to be bilaterally symmetric with respect to the imaginary central plane C.

It is noted that the light flux width expander 7 only needs to include the first light flux width expander 7A and the second light flux width expander 7B so disposed as to be symmetric with respect to the imaginary central plane C and does not necessarily have an outer shape bilaterally symmetric with respect to the imaginary central plane C, as in the first embodiment.

The first light flux width expander 7A has a first light incident surface 71N, which faces the side where the light separator 6 is located (light incident side) and where a plurality of lenslets 71 are arranged, and has a first flat surface 71S on the light exiting side. The lenslets 71 are each a Powell lens. The first flat surface 71S inclines and extends toward the side where the light separator 6 is disposed (positive side of direction Z) as the first flat surface 71S gets farther from the imaginary central plane C. The lenslets 71 extend in the layering direction V. The plurality of lenslets 71 are arranged on the first light incident surface 71N in the width direction H, which is perpendicular to the layering direction V. The width direction H is a direction along the first plane P and perpendicular to the first direction FA, which is the direction in which the first partial light flux EA exits.

The first light flux width expander 7A processes the first partial light flux EA having exited out of the light separator 6 as fellows: In the width direction H, the width of the first partial light flux EA is expanded; but in the layering direction V, the direction of the first partial light flux EA substantially parallelized by the collimator 5 is maintained. The plurality of lenslets 71 thus provided in the first light flux width expander 7A are so formed that the light fluxes expanded by the lenslets 71 adjacent to each other in the width direction H are superimposed on one another. That is, the first light flux width expander 7A expands the width of the first partial light flux EA incident thereon only in the direction corresponding to the width direction H out of the directions perpendicular to the layering direction V. The width of the first output light LA having exited out of the first light flux width expander 7A is therefore expanded only in the direction along the projection surface SC on opposite sides of the first optical axis 3a.

The second light flux width expander 7B has a second light incident surface 72N, which faces the side where the light separator 6 is located (light incident side) and where a plurality of lenslets 72 are arranged, and has a second flat surface 72S on the light exiting side. The lenslets 72 are each a Powell lens. The second flat surface 72S inclines and extends toward the side where the light separator 6 is disposed (positive side of direction Z) as the second flat surface 72S gets farther from the imaginary central plane C. The plurality of lenslets 72 are arranged on the second light incident surface 72N in a second width direction H1, which is so set that the width direction H and the second width direction H1 are symmetric with respect to the imaginary central plane C. The second width direction H1 is a direction along the first plane P and perpendicular to the second direction FB, which is the direction in which the second partial light flux EB exits.

The second light flux width expander 7B processes the second partial light flux EB having exited out of the light separator 6 as follows: In the second width direction H1, the width of the second partial light flux EB is expanded; but in the layering direction V, the direction of the second partial light flux EB substantially parallelized by the collimator 5 is maintained. The plurality of lenslets 72 thus provided in the second light flux width expander 7B are so formed that the light fluxes expanded by the lenslets 72 adjacent to each other in the second width direction H1 are superimposed on one another. That is, the second light flux width expander 7B expands the width of the second partial light flux EB incident thereon only in the direction corresponding to the second width direction H1 out of the directions perpendicular to the layering direction V. The width of the second output light LB having exited out of the second light flux width expander 7B is therefore expanded only in the direction along the projection surface SC on opposite sides of the second optical axis 3b.

In the light outputting apparatus 2, the width direction H of the light that exits out of the first light flux width expander 7A, and the second width direction H1, which is the width direction of the light that exits out of the second light flux width expander 7B, are directions along the rightward/leftward direction X of the projection surface SC, as shown in FIG. 3. The width of the first output light LA that exits out of the first light flux width expander 7A and the width of the second output light LB that exits out of the second light flux width expander 7B are therefore expanded in directions along the rightward/leftward direction X of the projection surface SC.

Primary Effects and Advantages Provided by First Embodiment

As described above, the light outputting apparatus 2 according to the first embodiment includes the light source 4, which outputs the first light flux E, the collimator 5, which parallelizes the first light flux E, the light separator 6, which separates the first light flux E into the first partial light flux EA and the second partial light flux EB, the first light flux width expander 7A, and the second light flux width expander 7B. The light separator 6 causes the first partial light flux EA to exit in the first direction FA and the second partial light flux EB to exit in the second direction FB. Under the definition that the first plane P is a plane containing the first direction FA and the second direction FB, the first light flux width expander 7a expands the width of the first partial light flux EA in a direction along the first plane P, and the second light flux width expander 7B expands the width of the second partial light flux EB in a direction along the first plane P.

The light outputting apparatus 2 according to the first embodiment thus divides the first light flux E outputted from the light source 4 into the first partial light flux EA and the second partial light flux EB and outputs the two partial light fluxes in two directions different from each other. The width of the first partial light flux EA is expanded by the first light flux width expander 7a, and the width of the second partial light flux EB is expanded by the second light flux width expander 7B. The light source 4 and the collimator necessary for creation of the light curtain LC, which covers the entire projection surface SC, can therefore each be a single component, whereby the number of parts of the light outputting apparatus 2 can be reduced. The part cost can therefore be reduced. The assembly man-hours can further be shortened. Further, the size of the light outputting apparatus 2 can be reduced.

In the first embodiment, the light separator 6 is a half-silvered mirror. The light separator 6 therefore has a low part cost, whereby the part cost of the light outputting apparatus 2 can be reduced.

In the light outputting apparatus 2 according to the first embodiment, the first light flux width expander 7A and the second light flux width expander 7B are formed of a single optical element. That is, the light flux width expander 7, which is a single optical element, includes the first light flux width expander 7A and the second light flux width expander 7B. Since the first light flux width expander 7A and the second light flux width expander 7B are formed of a single optical element as described above, the number of parts can be reduced, and the assembly man-hours can be shortened. Further, the first light flux width expander 7A and the second light flux width expander 7B can be positioned with increased precision.

In the first embodiment, the first light flux width expander 7A and the second light flux width expander 7B are each formed of Powell lenses. Using Powell lenses allows expansion of the width of a light flux in a direction along the projection surface SC but no expansion of the light flux in the directions that intersect the projection surface SC. The light curtain LC can thus be created by the light having exited in directions along the projection surface SC.

In the first embodiment, the first light flux width expander 7A includes a lens array in which the lenslets 71, which are each formed of a Powell lens, are arranged in an array. The second light flux width expander 7B similarly includes a lens array in which the lenslets 72, which are each formed of a Powell lens, are arranged in an array. As described above, the arrayed Powell lenses superimpose the light fluxes caused by adjacent lenslets 71 and 72 to spread on each other, as described above, whereby bias of the intensity distribution of the light in the directions along the projection surface SC can be suppressed.

Second Embodiment

Figure 5:
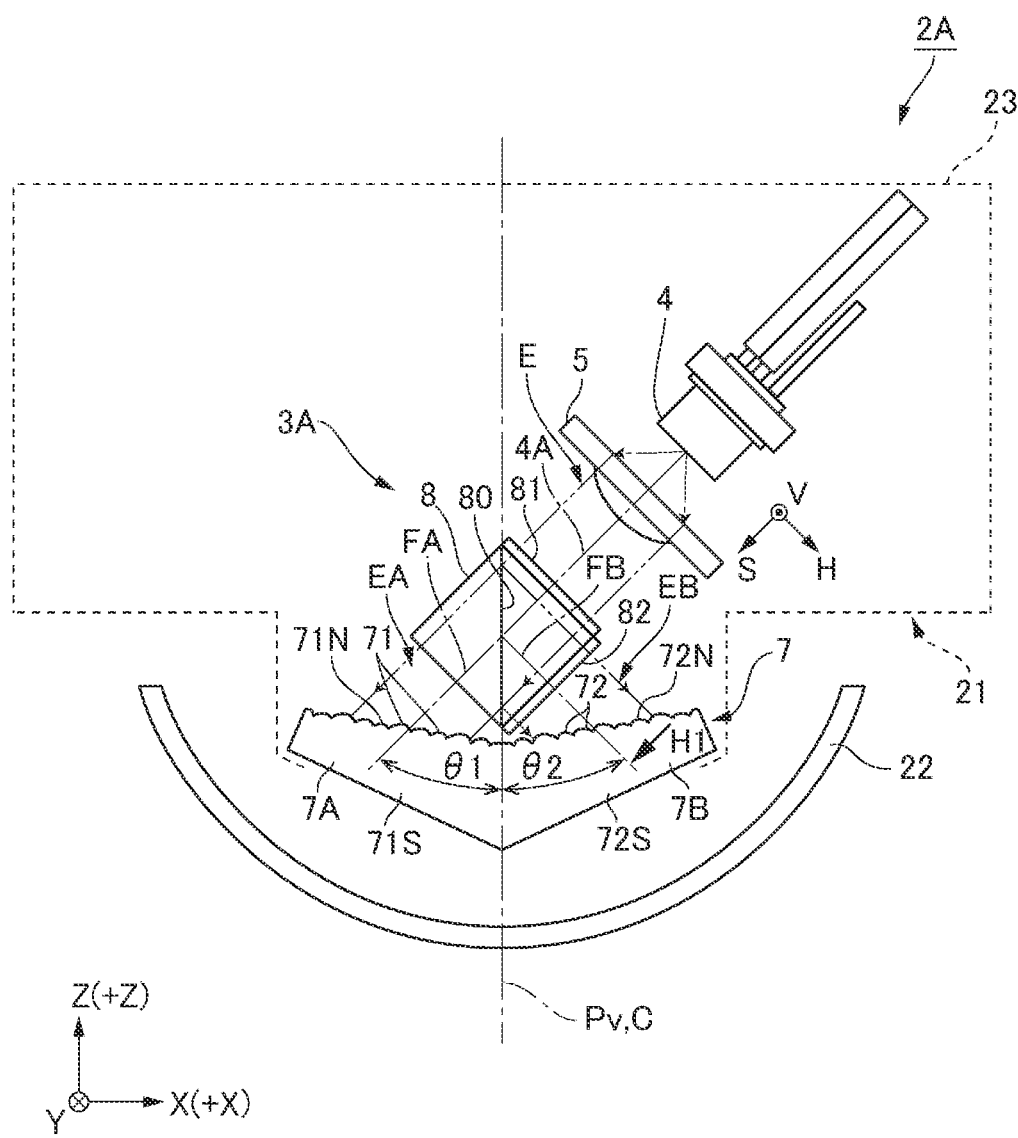
FIG. 5 is a diagrammatic view showing a schematic configuration of a light outputting apparatus according to a second embodiment.

FIG. 5 is a diagrammatic view showing a schematic configuration of a light outputting apparatus 2A according to a second embodiment. The light outputting apparatus 2A according to the second embodiment includes a light outputting section 3A. The light outputting section 3A is the same as the light outputting section 3 in the first embodiment except for a light separator 8. The same configuration therefore has the same reference character and will not be described. Further, the light outputting apparatus 2A is implemented in the image display system 100 in the same manner as in the first embodiment, and no description will therefore be made of the implementation of the light outputting apparatus 2A in the image display system 100.

The light separator 8 in the second embodiment is a polarization separator that separates light incident thereon into P-polarized light and S-polarized light. More specifically, the light separator 8 is a polarizing beam splitter (PBS) formed of two right-angled prisms bonded to each other with a metal thin film, such as a dielectric multilayer film, formed on a bonding surface 80 along which the two prisms are bonded to each other. A polarizing beam splitter is more readily assembled than a half-silvered mirror. That is, a half-silvered mirror is a thin member and is therefore difficult to place with precision, whereas a polarizing beam splitter, which has a cubic shape, is readily disposed with precision.

A first retardation film 81 is disposed between the light separator 8 and the collimator 5. The first retardation film 81 is a quarter wave plate. The first light flux E is laser light and is converted into circularly polarized light when passing through the first retardation film 81. The first light flux E is separated by the light separator 8 into the first partial light flux EA, which passes through the bonding surface 80, and the second partial light flux EB, which is reflected off the bonding surface. The first partial light flux EA is P-polarized light, and the second partial light flux EB is S-polarized light. The light separator 8 causes the first partial light flux EA to exit in the first direction FA and the second partial light flux EB to exit in the second direction FB.

A second retardation film 82 is disposed between the light separator 8 and the second light flux width expander 7B. The second retardation film 82 is a half wave plate. The second light flux EB is converted from the S-polarized light into P-polarized light when passing through the second retardation film 32. Surface reflection of the second partial light flux EB incident on the second light flux width expander 7B can thus be reduced. A decrease in the amount of light that forms the light curtain LC can therefore be suppressed, whereby the light curtain LC can be produced with improved efficiency.

Third Embodiment

Figure 6:
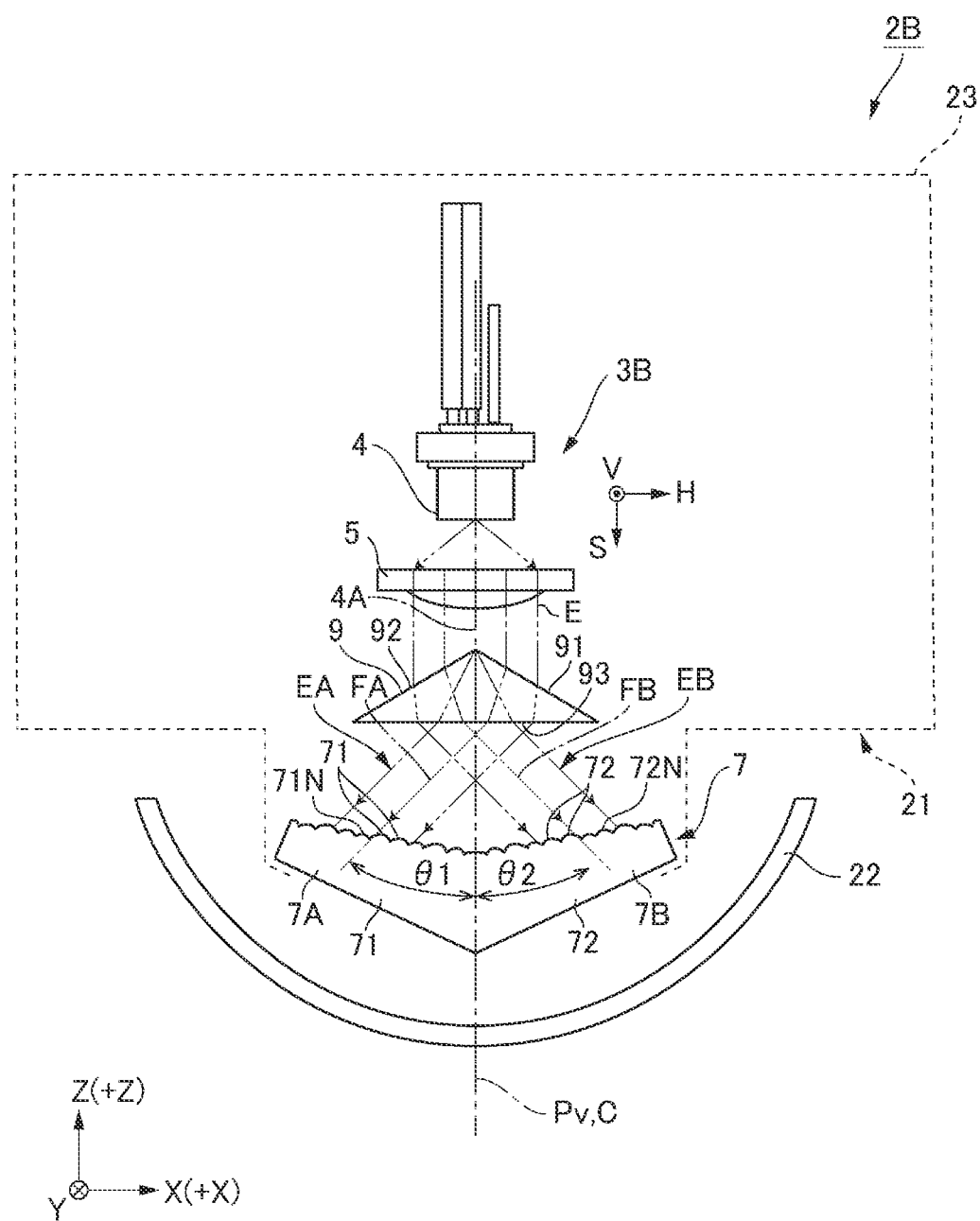
FIG. 6 is a diagrammatic view showing a schematic configuration of a light outputting apparatus according to a third embodiment.
Figure 7:
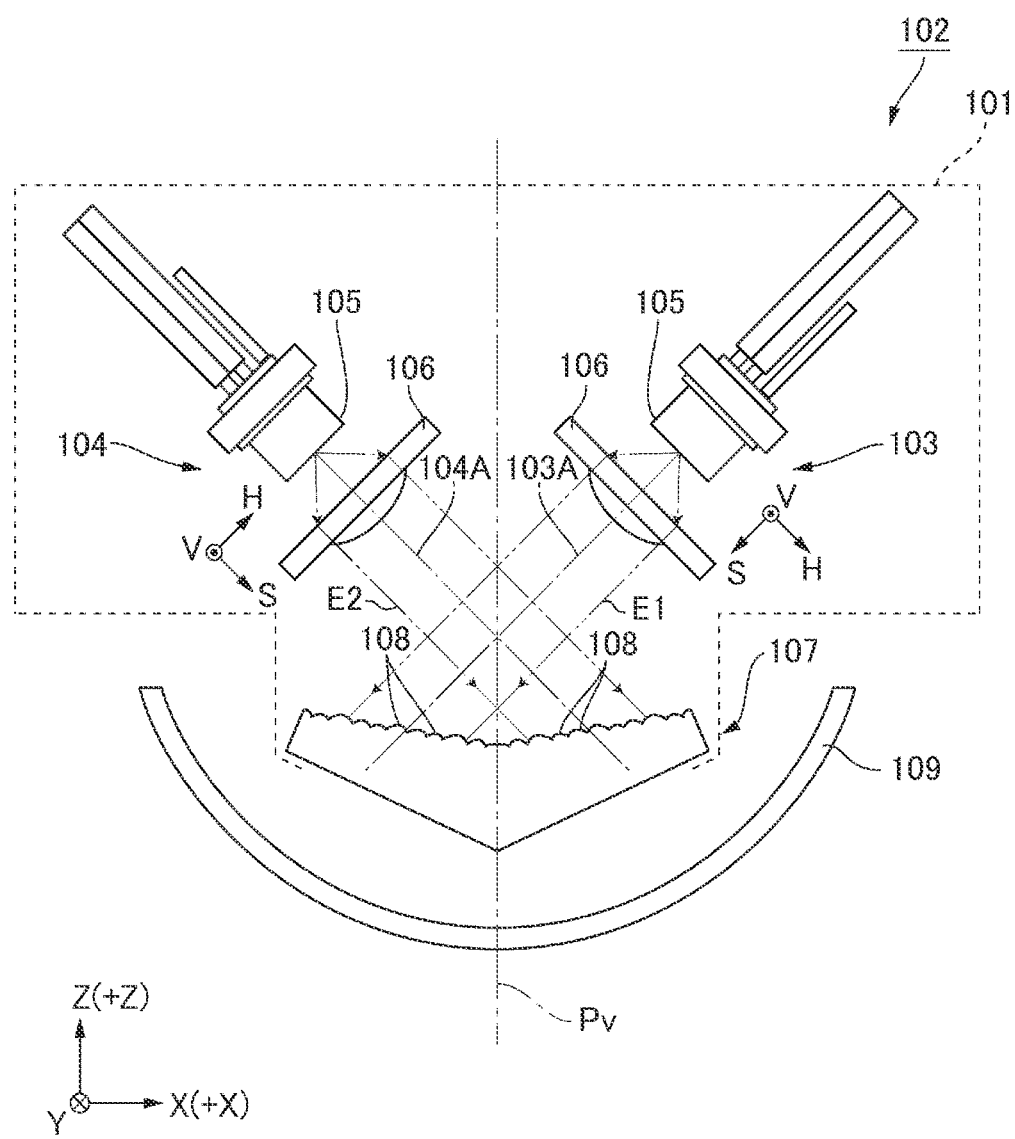
FIG. 7 is a diagrammatic view showing a schematic configuration of a light outputting apparatus according to Comparative Example.

FIG. 6 is a diagrammatic view showing a schematic configuration of a light outputting apparatus 2B according to a third embodiment. The light outputting apparatus 2B according to the third embodiment includes a light outputting section 3B. The light outputting section 3B is the same as the light outputting section 3 in the first embodiment except for the configuration of a light separator 9 and the arrangement of the light source 4 and the collimator 5. The same configuration therefore has the same reference character and will not be described. Further, the light outputting apparatus 2B is implemented in the image display system 100 in the same manner as in the first embodiment, and no description will therefore be made of the implementation of the light outputting apparatus 2B in the image display system 100.

The light separator 9 in the third embodiment is a triangular prism. The light separator 9 has a first inclining surface 91, a second inclining surface 92, and a bottom surface 93. The light flux width expander 7 is configured to be bilaterally symmetric with respect to the imaginary central plane C of the light flux width expander 7. The first inclining surface 91 inclines in the counterclockwise direction with respect to the imaginary central plane C, and the second inclining surface 92 inclines in the clockwise direction with respect to the imaginary central plane C. In the third embodiment, the light source 4 and the collimator 5 are so disposed that the optical axis 4A of the light source coincides with the imaginary central plane C and the optical axis 4A is parallel to the vertical direction Z. Part of the first light flux E is incident on the first inclining surface 91, and another part of the first light flux E is incident on the second inclining surface 92.

The light flux incident on the first inclining surface 91 exits via the bottom surface 83 in the first direction FA. The light flux incident on the second inclining surface 92 exits via the bottom surface 63 in the second direction FB. The light separator 9 therefore separates the first light flux E into the first partial light flux EA, which exits in the first direction FA, and the second partial light flux EB, which exits in the second direction FB.

In the third embodiment, a triangular prism is used as the light separator 9, and the part cost of the light separator 9 is therefore low. The part cost of the light outputting apparatus 2B can therefore be reduced.

In the third embodiment, in which the light source 4, the collimator 5, the light separator 9, and the light flux width expander 7 can be arranged in a single row in the direction along the imaginary central plane C, the light outputting apparatus 23 is readily assembled. Further, the dimension of the light outputting apparatus 2B in the rightward/leftward direction X can be reduced.

Variations of First to Third Embodiments (1) In each of the embodiments described above, one of the first light flux width expander 7A and the second light flux width expander 7B may be an optical element formed of components different from Powell lenses. For example, directional lenses, such as cylindrical lenses, may be used. The first light flux width expander 7A and the second light flux width expander 7B may each be formed of cylindrical lenses. Further, the lens array in which lenslets are arranged in an array may be replaced with a single Powell lens.

(2) In each of the embodiments described above, different optical elements separate from each other may be used as the first light flux width expander 7A and the second light flux width expander 7B.

Other Embodiments

The present disclosure is not limited to the embodiments described above, and a variety of aspects can be implemented to the extent that the aspects do not depart from the substance of the present disclosure. For example, the image display system 100 according to each of the embodiments described above projects the video light GL on the projection surface SC via the projector 1, and the projection surface SC only needs to be a display surface that displays an image. For example, the display surface of a liquid crystal display, an organic SL display, or any other display may be covered with the light curtain formed by the light outputting apparatus.

What is claimed is:
1. A light outputting apparatus comprising:
a light source that outputs a first light flux;
a collimator that parallelizes the first light flux;
a light separator that separates the first light flux into a first partial light flux and a second partial light flux;
a first light flux width expander; and
a second light flux width expander,
wherein the light separator causes the first partial light flux to exit in a first direction and the second partial light flux to exit in a second direction,
when a first plane is assumed to be a plane containing the first direction and the second direction,
the first light flux width expander expands a width of the first partial light flux in a direction along the first plane, and
the second light flux width expander expands a width of the second partial light flux in a direction along the first plane.

2. The light outputting apparatus according to claim 1, wherein the light separator is a half-silvered mirror.

3. The light outputting apparatus according to claim 1, wherein the light separator is a triangular prism.

4. The light outputting apparatus according to claim 1, wherein the light separator is a polarization separator.

5. The light outputting apparatus according to claim 4, wherein a first retardation film is disposed between the collimator and the polarization separator.

6. The light outputting apparatus according to claim 5, wherein a second retardation film is disposed between the polarization separator and the second light flux width expander.

7. The light outputting apparatus according to claim 1, wherein the first light flux width expander and the second light flux width expander are formed of a single optical element.

8. The light outputting apparatus according to claim 1, wherein one or both of the first light flux width expander and the second light flux width expander are a Powell lens.

9. An image display system comprising:
the light outputting apparatus according to claim 1;
a detection apparatus that detects a position where light outputted from the light outputting apparatus is reflected; and
a projection apparatus that projects an image according to a result of the detection performed by the detection apparatus.

* * * * *